United States Patent
Han et al.

(10) Patent No.: US 10,712,437 B2
(45) Date of Patent: Jul. 14, 2020

(54) RADAR SYSTEMS AND METHODS UTILIZING COMPOSITE WAVEFORMS FOR CUSTOMIZATION OF RESOLUTION REQUIREMENTS

(71) Applicant: Veoneer US, Inc., Southfield, MI (US)

(72) Inventors: Q H Han, Lowell, MA (US); Dirk Klotzbuecher, Mainstockheim (DE)

(73) Assignee: Veoneer US, Inc., Southfield, MI (US)

( * ) Notice: Subject to any disclaimer, the term of this patent is extended or adjusted under 35 U.S.C. 154(b) by 243 days.

(21) Appl. No.: 15/643,644

(22) Filed: Jul. 7, 2017

(65) Prior Publication Data

US 2019/0011548 A1 Jan. 10, 2019

(51) Int. Cl.
| | |
|---|---|
| *G01S 13/58* | (2006.01) |
| *G01S 13/30* | (2006.01) |
| *G01S 13/931* | (2020.01) |
| *G01S 13/64* | (2006.01) |
| *G01S 13/28* | (2006.01) |

(52) U.S. Cl.
CPC .......... *G01S 13/582* (2013.01); *G01S 13/282* (2013.01); *G01S 13/30* (2013.01); *G01S 13/64* (2013.01); *G01S 13/931* (2013.01)

(58) Field of Classification Search
None
See application file for complete search history.

(56) References Cited

U.S. PATENT DOCUMENTS

| | | | |
|---|---|---|---|
| 5,657,022 A | 8/1997 | Van Etten et al. | |
| 7,420,502 B2 | 9/2008 | Hartzstein et al. | |
| 7,724,181 B2 | 5/2010 | Natsume | |
| 7,928,897 B2 | 4/2011 | Ishii et al. | |
| 8,077,076 B2 | 12/2011 | Walter et al. | |
| 8,390,506 B2 | 3/2013 | Focke et al. | |
| 8,390,507 B2 | 3/2013 | Wintermantel | |
| 8,654,006 B2 | 2/2014 | Landez et al. | |
| 8,902,103 B2 | 12/2014 | Kim et al. | |
| 8,976,061 B2 | 3/2015 | Chowdhury | |
| 9,244,164 B2 | 1/2016 | Luebbert et al. | |

(Continued)

FOREIGN PATENT DOCUMENTS

| | | |
|---|---|---|
| CN | 103592645 | 2/2014 |
| DE | 102009057191 A1 | 6/2011 |

(Continued)

*Primary Examiner* — Whitney Moore
(74) *Attorney, Agent, or Firm* — Burns & Levinson LLP; Steven M. Mills

(57) ABSTRACT

System and methods are provided which involve a radar system that includes one or more signal generators configured for generating a composite radar waveform formed by combining different component waveforms; and a detector for detecting reflected signals from the composite waveform and determining velocity and distance measurements of a target relative to a host vehicle. Advantageously, the first and second component waveforms are selected such that the composite waveform is able to meet two different sets of resolution requirements with respect to at least one of: (i) the velocity measurement of the target vehicle relative to the host vehicle and (ii) the distance measurement of a target vehicle relative to the host vehicle. Notably, each of the different sets of resolution requirements is pre-selected based on a different type of detection scenario.

25 Claims, 5 Drawing Sheets

(56) References Cited

U.S. PATENT DOCUMENTS

| | | | |
|---|---|---|---|
| 9,612,323 B2 | 4/2017 | Ishimori | |
| 2005/0225481 A1 | 10/2005 | Bonthron | |
| 2009/0284407 A1 | 11/2009 | Aoyagi | |
| 2012/0242530 A1* | 9/2012 | Luebbert | G01S 13/22 342/70 |
| 2015/0002332 A1 | 1/2015 | Bi et al. | |
| 2015/0084806 A1 | 3/2015 | Rohling | |
| 2016/0124086 A1* | 5/2016 | Jansen | G01S 13/582 342/93 |

FOREIGN PATENT DOCUMENTS

| | | |
|---|---|---|
| EP | 0863409 | 9/1998 |
| EP | 0867731 | 9/1998 |
| EP | 1570295 | 9/2005 |
| EP | 3015880 A1 | 5/2016 |
| FR | 2221742 | 10/1974 |
| WO | 2004053521 | 6/2004 |

* cited by examiner

RADAR SYSTEMS AND METHODS UTILIZING COMPOSITE WAVEFORMS FOR CUSTOMIZATION OF RESOLUTION REQUIREMENTS

RELATED APPLICATION

This application is related to a U.S. Patent Application entitled, "Systems and Methods for Resolving Velocity Ambiguity in an Automotive Radar System," of common Assignee/Applicant, filed on even date herewith, the entire contents of which are incorporated herein by reference.

BACKGROUND

1. Technical Field

The present disclosure is related to frequency ambiguity resolution in a LFMCW (Linear Frequency Modulated continuous waveform) pulse-Doppler radar system such as an automotive radar system. More particularly, the systems and methods of the present disclosure enable determination of true target velocity. The present disclosure may have particular applicability in the context of a multiple target environment, e.g., wherein targets having different speeds may be grouped together on account of velocity aliasing.

2. Background

A pulse-Doppler radar system is a radar system that determines the range to a target using pulse-timing techniques, and uses the Doppler effect of the returned signal to determine the target object's velocity. LFMCW measure range by the frequency shift of Mixer output. LFMCW pulse-Doppler radar combines the features of pulse radars and continuous-wave radars. Pulse-Doppler systems generally measure the range to objects by measuring the elapsed time between sending a pulse and receiving a reflection from the object. In particular, since waves travel at the speed of light, the distance to a target can be calculated based on elapsed time multiplied by the speed of light divided by two. Velocity is generally determined based on the Doppler shift (frequency shift) of the reflected signal. In particular, as the target moves between each transmit pulse, the returned signal has a phase difference or phase shift from pulse to pulse. This causes the target to produce Doppler modulation on the reflected signal. Thus, the radar to separate the reflections from multiple targets located in the same volume of space by identifying the targets using respective phase shifts.

Pulse-Doppler begins with pulses (e.g., coherent pulses) transmitted through an antenna or transducer. Energy from the transmitted pulses propagates through space until it is reflected by some reflector object (i.e., a target object). This disruption causes some of the transmit energy to be reflected back to the radar antenna or transducer, along with phase modulation caused by the radial velocity of the reflector (relative to the sensor/detector). Typically the received signal is down-converted to base-band (based on the initial transmit) prior to processing. Sampling begins after each transmit pulse sequence. Sampling is typically divided into equal sample intervals (or bins). After sampling is completed the next pulse sequence is transmitted.

Pulse-Doppler signal processing involves with I and Q sampling of the received signal. In particular, the wave-front from the reflector forms a spiral pattern which the receiver converts into two electrical samples called I and Q. Typically, the local oscillator is split into two signals that are offset by 90 degrees, and each goes to two different detectors along with the receive signal. One detector produces I(t) and the other produces Q(t). An example detection automotive radar system is later described in greater detail herein.

Notably, there are two types of ambiguity which arise during sampling. Distance ambiguity occurs where a single sample period may include reflections from multiple transmit periods. In this case, the elapsed time from transition to detection can be characterized as the elapsed time from the last transmit period plus some multiple of the transmit cycle period (thus, illustrating the ambiguity). Velocity ambiguity likewise arises where phase shifts can only be distinguished within a full period of the signal. Thus, velocities that produce phase shifts offset from one another by a multiples of the period would be indistinguishable (i.e., would have the same I and Q values. Note that there is typically a tradeoff between distance ambiguity and velocity ambiguity. The lower the pulse repetition frequency (PRF) the larger the range of ambiguous distance values, however, this in turn results in a narrower range of ambiguous velocity values (since velocity can only unambiguously distinguish where the Doppler frequency is lower than the PRF).

During processing, reflected signals are typically separated into a number of frequency filters. There is a separate set of filters for each ambiguous range (velocity and distance). The I and Q samples described above are used to begin the filtering process. Typically, these samples are organized into a matrix of time domain samples. Time domain samples are then converted to the frequency domain using a digital filter. This usually involves a fast Fourier transform (FFT). Note that side-lobes and other artifacts resulting during signal processing may be suppressed, e.g., by implementing an appropriate windowing function.

For example, in some embodiments it may be possible to obtain object resolution within one or more of three measurement categories: 1) Range Resolution: range resolution (Rres) follows a function of Tx (transmit) frequency bandwidth (BW), where $Rres=\frac{1}{2} \cdot Co/BW$. Typically, the bandwidth is limited for regulatory reasons. 2) Angular Resolution Ares): angular resolution can be estimated as a function of the effective antenna aperture (i.e. Deff), where Ares is estimated as $\frac{1}{2} \cdot \Pi \cdot \lambda/Deff$. 3) Doppler (velocity) Resolution: Doppler resolution (also known as velocity resolution) Vres is determined as a function of dwell time (i.e. Td), where $Vres=(\frac{1}{2} Co)/(Td \cdot Fo)$. For example, a radar may dwell at a particular discrete range to search for the presence of objects at that range before indexing to the next in a sequence of discrete ranges. Notably, regarding dwell time, Doppler resolution may in preferred embodiments be at least 0.5 km/h which at 77 GHz requires a 14 ms dwell time. The amount of data to be processed, however, is linearly related to recording time which have implications for processor load and memory consumption. Therefore, memory and processor constraints are important considerations.

FMCW (Frequency-Modulated Continuous Wave) radar systems are a special type of radar sensor which radiates continuous transmission power like a simple continuous wave (CW) radar. In contrast, however, FMCW radar can change its operating frequency during the measurement: that is, the transmission signal is modulated in frequency (or in phase). Runtime measurements are technically possible with these changes in the frequency (or phase). Simple CW systems without frequency modulation are disadvantaged with respect to target range determination. In contrast with a FMCW signal, when an echo signal is received, that change of frequency gets a delay similar to the pulse radar technique which can advantageously be measured based on differences in phase and/or frequency between the actually transmitted and the received signal.

In the context of automotive radar systems, given processing constraints and detection needs can lead to ambiguity and in particular velocity ambiguity. To illustrate, FIG. 1 depicts an experiment where a stationary target and a moving target with a relative velocity equal to the calculated ambiguous range of 0.4 m/s for the radar system were each detected. The distance and velocity sample bins are illustrated in FIG. 2 for various target sizes. Note that in FIG. 2, dBsm (decibel relative to one square meter) is used to indicate the (RCS) radar cross-section of the target. For example a larger target such as a large car may have a larger dBsm (e.g., 20 dBsm) while a smaller target such a smaller car may have a smaller dBsm (e.g., 10 dBsm) while a target with a really small reflection size such as a bicycle may have a dBsm close to 0. As demonstrated, regardless of reflection size, there is a significant overlap where the two targets cannot be distinguished due to overlapping ambiguous range and velocity values. Thus, in a multiple target tracking system it becomes particularly critical to provide a degree of ambiguity resolution. These and other needs are met by the systems and methods of the subject application Notably, the radar system described herein may be used for detecting other vehicles, fixed objects and pedestrians, where pedestrian protection will become of an increased importance. For detection of pedestrians, a radar system should be able to detect objects such as pedestrians at a sufficient distance and to classify detected objects as pedestrians if that is the case, being able to resolve a pedestrian from clutter. Since transmitted signals are often bandwidth restricted it may be difficult to differentiate between pedestrians and clutter using conventional processing.

SUMMARY

Systems and methods are provided herein for resolving velocity ambiguity in an automotive radar system. In example embodiments, the systems and methods may employ one or more signal generators configured for generating a transmit signal including a composite linear frequency modulated continuous waveform. This waveform may advantageously be formed by alternating between, interleaving or otherwise combining at least first and second component waveforms. Each component waveform may generally be characterized by a repeated super-pulse sequence (of N super-pulses) with a pre-determined cycle time (Tc), each super-pulse cycle including an active phase with a time Ta<Tc and an inactive phase with a time Ti<Tc, wherein Ta+Ti=Tc. The active phase is typically be characterized by a sequence of a plurality of pulses (M pulses), where each pulse is characterized by a change in frequency between low and high pulse frequencies (Fl to Fh, or Fh to Fl) and has a pulse cycle (Tp) such that Ta=M×Tp. The inactive phase is usually characterized by a pause between respective last and first sub-pulses of sequential super-pulses. Advantageously, each component waveform may be characterized by a different velocity ambiguity. Thus, e.g., the first and second component waveforms may be characterized by the super-pulses of the first and second respective waveforms having one or more of (i) differing numbers of pulses M, (ii) differing pulse durations Td (iii) differing low pulse frequencies Fl (iv) differing high pulse frequencies Fh and/or (v) differing inactive phases Tp whereby the first and second component waveforms are characterized by having different velocity ambiguity ranges.

The systems and methods may further employ a detector for detecting reflected signals from the composite waveform and for determining velocity and distance of a target relative to a host vehicle based on Doppler shift, wherein velocity ambiguity range is different for the respective reflected signals of the component waveforms so as to allow for ambiguity resolution when considered in combination with one another. In example embodiments, true velocity for a target may be determined based on identifying corresponding Doppler bins that correctly reflect ambiguous velocity calculations for both component waveforms.

In example embodiments, the composite waveform may further include alternating between, interleaving or otherwise combining a third component waveform characterized by a different velocity ambiguity range than the first and second component waveforms. In fact the composite waveform may be formed from any number of component waveforms each characterized by a different velocity ambiguity range. Moreover, which in example embodiments, the component waveforms may have a pre-defined structure, e.g., 8 super-pulses each with 16 pulses, the present disclosure is not limited to such an implementation and it will be appreciated that any number of different configurations may be utilized.

In example embodiments, the automotive radar system may advantageously be configured to apply ambiguity resolution only where the host vehicle is in a predetermined range a predetermined velocity. In such embodiments, a lower velocity host vehicle may have a shorter required distance range for detection which may facilitate ambiguity resolution. Alternatively, ambiguity resolution may only be required where a target is within a predetermined range of the host vehicle. Again the predetermined range may be a dynamic range based on the velocity of the host vehicle.

In further example embodiments, a radar system is presented comprising one or more signal generators and a detector. The one or more signal generators may again be configured, for generating a transmit signal including a composite linear frequency modulated continuous waveform formed as described herein. In these further example embodiments the detector may be generally configured for detecting reflected signals from the composite waveform and determining characteristics of a target relative to a host vehicle, wherein the first and second component waveforms are selected such that the composite waveform is able to meet two different sets of resolution requirements and wherein the velocity ambiguity range is different for the respective reflected signals of the component waveforms so as to allow for ambiguity resolution when considered in combination with one another. Advantageously the radar system may further include processor for ambiguity resolution, the processor configured to determine a true velocity for a target based determining corresponding Doppler bins that correctly reflect ambiguous velocity calculations for both component waveforms.

In some embodiments of the radar system, each of the composite waveforms may be configured to meet a different set of resolution requirements. Notably each of the different sets of resolution requirements may be for a different scenario as characterized by target size, target identification, target speed, target position, target range, host vehicle speed and/or environment. For example, a first set of resolution requirements for a first scenario may involve increased maximum range requirements and reduced velocity and range accuracy requirements while a second set of resolution requirements for a second scenario may involve decreased maximum range requirements and increased velocity and range accuracy requirements. In some embodiments, sampling of the composite waveform may be constant. In other embodiments, sampling of the composite waveform may be variable, e.g., for each of the component waveforms and or based on changing resolution requirements.

In further example embodiments, a radar system is presented including one or more signal generators configured for generating a composite radar waveform formed by combining different component waveforms; and a detector for detecting reflected signals from the composite waveform and determining velocity and distance measurements of a target relative to a host vehicle. Advantageously, the first and second component waveforms may be selected such that the composite waveform is able to meet two different sets of resolution requirements with respect to at least one of: (i) the velocity measurement of the target vehicle relative to the host vehicle and (ii) the distance measurement of a target vehicle relative to the host vehicle, wherein each of the different sets of resolution requirements is selected for a different detection scenario.

In some embodiments, the first and second component waveforms each include a series of pulses. For example, the first component waveform may have a different pulse repetition pattern than the second pulse repetition frequency, wherein a first pulse repetition pattern of the first component waveform is selected to meet a first predetermined set of resolution requirements applicable for a first detection scenario and a second pulse repetition pattern of the second component waveform is selected to meet a second predetermined set of resolution requirements applicable for a second detection scenario. Advantageously, the first pulse repetition pattern is characterized by a different pulse repetition frequency than the second pulse repetition pattern. The primary purpose of this may be to customize each waveform to meet a different set of resolution requirements as applicable with respect to a particular scenario. A secondary advantage may be to provide for ambiguity resolution such as described herein.

As noted above, in example embodiments, each component waveform may include a repeated super-pulse sequence (of N super-pulses) with a pre-determined cycle time (Tc), each super-pulse cycle including an active phase with a time $Ta<Tc$ and an inactive phase with a time $Ti<Tc$, wherein $Ta+Ti=Tc$, the active phase characterized by a sequence of a plurality of pulses (M pulses) each with a pulse duration Td. Thus, in some embodiments, each component waveform may be characterized by a different cycle time Tc for its repeated super-pulse sequence. For example, the different cycle time Tc may be characterized by a different active phase Ta as characterized by one or more of: (i) a different number of pulses per super-pulse or (ii) a different pulse duration Td. Alternatively, the different cycle time Tc may be characterized by a different inactive phase Ti. Advantageously, each cycle time Tc may provide for a different resolvable range and accuracy of values, e.g., with respect to determining target vehicle distance and or velocity relative to the host vehicle. Note that while some embodiments, the pulses are may be coherent, in further embodiments, each pulse may also characterized by a change in frequency between low and high pulse frequencies (Fl and Fh). Thus, each component waveform may be characterized by one or more of: (i) a different low pulse frequencies Fl or (ii) a different high pulse frequency Fh. Advantageously the different low or high frequencies may again provide for a different resolvable range and accuracy of values, e.g., with respect to determining target vehicle distance and or velocity relative to the host vehicle.

In other embodiments, the first and second component waveforms are not necessarily limited to pulsed waveforms. Thus, in the first and second component waveforms may each be any type of repetitive/patterned waveform. For example, in some embodiments, the first and second component waveforms may each be repetitive oscillation waveforms such as frequency modulated (FM) waveforms (although other types of modulation such as amplitude modulation are also contemplated). As noted above, in example embodiments, oscillations in each of the first and component waveforms vary between low and high pulse frequencies (Fl and Fh), e.g., where each component waveform may be characterized by one or more of: (i) a different low pulse frequencies Fl or (ii) a different high pulse frequency Fh. Note that in some embodiments, the first and second component waveforms are each continuous waveforms.

As previously discussed with respect to different embodiments, the first and second component waveforms may be interleaved to form the composite waveform. Alternatively, the first and second component waveforms may be alternated to form the composite waveform. Interleaved waveforms, e.g., where pulses of one component waveform are interspersed between pulses of the other component waveform, may enable compressed data acquisition and therefor faster processing times. Thus, e.g., in some embodiments, the composite waveform may alternate pulses between each of the component waveforms, e.g., wherein the pulses of first component waveform are characterized by different high and/or low pulse frequencies than the pulses of the second component waveform. Processing of this waveform may include sampling the entire composite waveform and performing a FFT thereon. Notably, the different low and high pulse frequencies may advantageously enable simultaneously satisfying two different sets of resolvable range and accuracy requirements, e.g., with respect to determining target vehicle distance and or velocity relative to the host vehicle. Notably there are other ways that component waveforms may be combined, e.g., via multiplexing thereof. Reflected signals may then be de-multiplexed to analyze the results for each component waveform separately. Alternatively, reflected signals may be analyzed without de-multiplexing, e.g., via a FFT. Advantageously, in some embodiments, a sampling of the composite waveform may be constant. In other embodiments, a sampling of the composite waveform may be variable for each of the component waveforms.

As noted above, the composite waveforms herein advantageously enable satisfying two different sets of resolution requirements, each for a different type of detection scenario. Thus, in example embodiments, each set of resolution requirements may include different accuracy requirements for at least one of: (i) the velocity measurement of the target vehicle relative to the host vehicle and (ii) the distance measurement of the target vehicle relative to the host vehicle. In further embodiments, each set of resolution requirements may include different maximum, minimum or resolvable range requirements for at least one of: (i) the velocity measurement of the target vehicle relative to the host vehicle and (ii) the distance measurement of the target vehicle relative to the host vehicle. Thus, by way of one example, the different sets of resolution requirements may include a first set of resolution requirements for a first scenario involving increased maximum distance resolution requirements and reduced velocity and range accuracy requirements and a second set of resolution requirements for a second scenario involving decreased maximum range requirements and increased velocity and range accuracy requirements. Note that each of the different sets of resolution requirements may be pre-selected for a different detection scenario, e.g., as characterized by target size, target identification, target speed, target position, target range, host vehicle speed and/or environment. Thus, for example, a highway type environment may have different resolution requirements than a city environment or a parking lot environment. Different host vehicle speed may also trigger different resolution requirements because of different stoppage/reaction times.

BRIEF DESCRIPTION OF THE DRAWINGS

The present disclosure is further described in the detailed description which follows, in reference to the noted plurality of drawings by way of non-limiting examples of embodiments of the present disclosure

DETAILED DESCRIPTION

Figure 3:
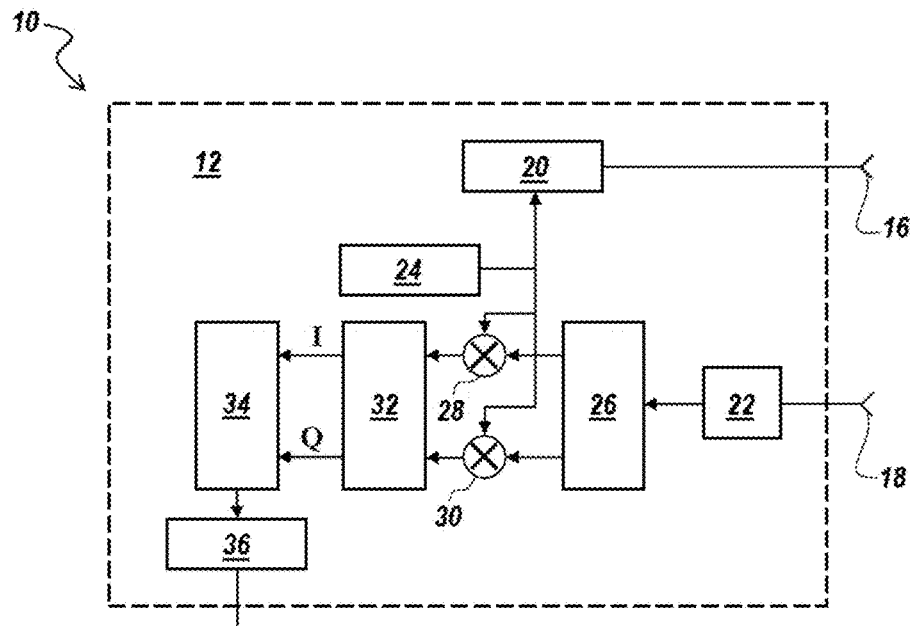
FIG. 3 depicts a block diagram of an example automotive radar system, according to the present disclosure.

As noted above, the systems and methods described herein may relate to the operations of an automotive radar system. FIG. 3 includes a schematic block diagram of an example automotive radar system 10, including one or more radar sensor modules 12 for processing automotive radar signals, in accordance with some exemplary embodiments. Referring to FIG. 3 radar system 10 includes one or more radar modules 12, which process radar transmit and receive signals which are compatible with radar system 10 in the host vehicle. Radar sensor module 12 generates and transmits radar signals into the region of interest adjacent to the host vehicle that is being monitored by the radar system. Generation and transmission of signals is accomplished by RF signal generator 24, radar transmit circuitry 20 and transmit antenna 16. Radar transmit circuitry 20 generally includes any circuitry required to generate the signals transmitted via transmit antenna 16, such as signal shaping/timing circuitry, transmit trigger circuitry, RF switch circuitry, RF power amplifier circuitry, or any other appropriate transmit circuitry used by radar system 10 to generate the transmitted radar signal according to exemplary embodiments described in detail herein. In some embodiments, the RF signal transmit circuitry 20 may include an RF switch mechanism may rely on inputs from an RF oscillator included in RF signal generator 24. The RF signal transmit circuitry may further advantageously include pulse shaping circuitry, e.g., based on transmit antenna trigonometric calculations.

Radar module 12 also receives returning radar signals at radar receive circuitry 22 via receive antenna 18. Radar receive circuitry 22 generally includes any circuitry required to process the signals received via receive antenna 18, such as RF low noise amplifier circuitry, signal shaping/timing circuitry, receive trigger circuitry, RF switch circuitry, or any other appropriate receive circuitry used by radar system 10. In some embodiments, radar receive circuitry 22 may also include a receiver antenna select module for selecting the receive antenna from a plurality of receive antennas. In some exemplary embodiments, the received signals processed by radar receive circuitry 22 are forwarded to phase shifter circuitry 26, which generates two signals having a predetermined phase difference. These two signals, referred to as an inphase (I) signal and a quadrature (Q) signal, are mixed with an RF signal from RF signal generator 24 by mixers 28 and 30, respectively, to generate I and Q intermediate frequency (IF) signals. In some embodiments mixing may further be based on pulse shaping of the RF signal from the RF signal generator 24 based on receive antenna trigonometric calculations. The resulting IF signals are further filtered as required by filtering circuitry 32 to generate filtered IF I and Q signals, labeled "I" and "Q" in FIG. 3. The IF I and Q signals are digitized by analog-to-digital converter circuitry (ADC) 34. These digitized I and Q IF signals are processed by a processor, such as a digital signal processor (DSP) 36. In some exemplary embodiments, the DSP 36 can perform all of the processing required to carry out the object detection and parameter determination, including object range, bearing and/or velocity determinations, performed by system 10. For example in some embodiments, the digital signals are used for retrieving an azimuth angle of possible targets by simultaneously sampling and analyzing phase and amplitude of the received signals. The analysis is generally performed by means of Fast Fourier Transform (FFT) processing.

It will be understood that the system configuration illustrated in FIG. 3 is exemplary only and that other system configurations can be used to implement the embodiments described herein. For example, the ordering of filtering of the IF signal and analog-to-digital conversion may be different than the order illustrated in FIG. 3. The IF signal may be digitized before filtering, and then digital filtering may be carried out on the digitized signal(s). In other embodiments, the entire IF stage may be removed so that the RF signal is directly converted to DC for further digitizing and processing. The ADC is sampled on one channel only.

Figure 4:
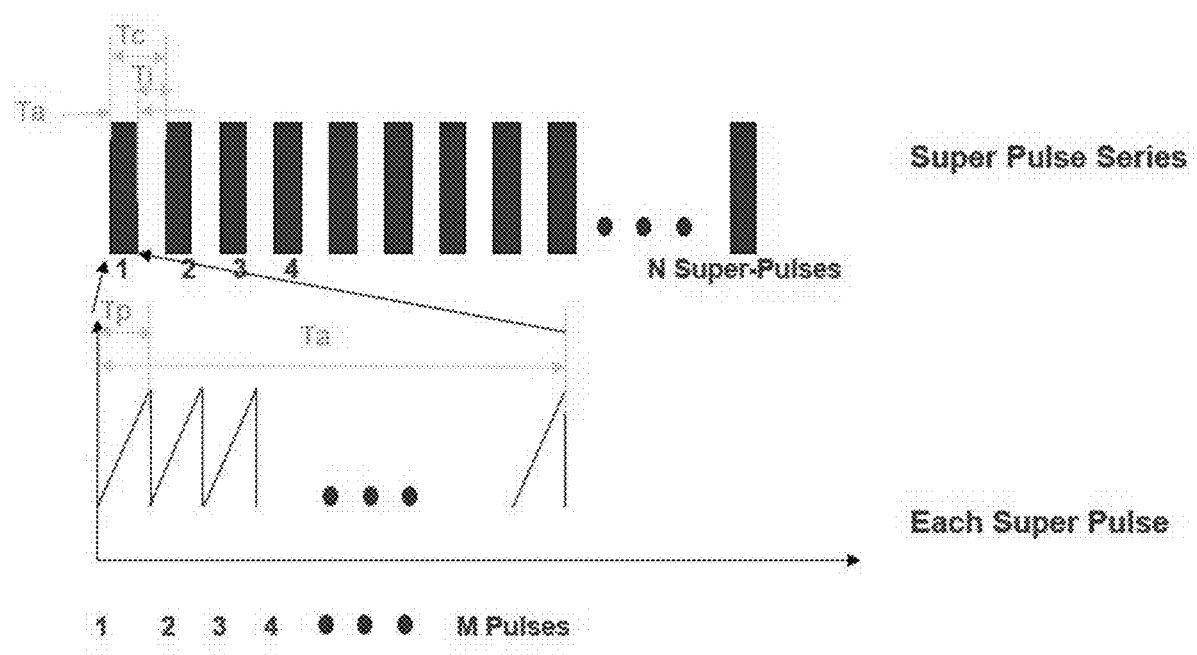
FIG. 4 depicts an example waveform structure for use with the systems and methods described herein, according to the present disclosure.

Advantageously, the systems and methods described herein utilize a unique waveform model to facilitate ambiguity resolution. This waveform model is illustrated with respect to FIG. 4. In particular, the waveform model is a linear frequency modulated continuous waveform characterized by a repeated super-pulse sequence of N super-pulses (e.g., N=8 super-pulses). The super-pulses may be characterized by a pre-determined cycle time Tc for each superpulse. Notably, the super-pulse cycle may typically include an active phase with a time Ta<Tc and an inactive phase with a time Ti<Tc (wherein Ta+Ti=Tc). As depicted, the active phase Ta may be characterized by a sequence of a plurality of M pulses (M=16 pulses) while the inactive phase Ti may be characterized by a pause between respective last and first sub-pulses of sequential super-pulses. Advantageously, each pulse in the plurality of M pulses may be characterized by a change in frequencies (e.g., a frequency ramp) between low and high pulse frequencies Fl and Fh and may include a pulse cycle Tp (Thus, Ta=M×Tp). While in example embodiments the pulses may be characterized by a uniform (fixed slope) frequency ramp, it is noted that the subject application is not limited to such embodiments. In particular, in alternative embodiments, the change in frequency may be disjointed, stepwise, or otherwise non-uniform provided that the frequency is modulated between the low and high frequencies. Thus, in some embodiments, the plurality of pulses may be implemented as a sawtooth wave or other periodic function. Furthermore, while in example embodiments the change in frequency may start at the low frequency Fl and end at the high frequency Fh, the subject application is not limited to such embodiments. Thus, for example, in alternative embodiments, the change in frequency may start at the high frequency Fh and end at the low frequency Fl, start and stop at a same frequency (e.g., at the low frequency Fl or at the high frequency Fh), or start and/or end at an intermediate frequency between the high and low frequencies.

As described herein, to enable ambiguity resolution, a composite waveform may be formed by alternating between, interleaving or otherwise combining at least two different sets of super-pulses. For example, a first component waveform based on a first set of parameters of the waveform model may include a first set of super-pulses characterized by a first Tc while the second component waveform based on a second set of parameters of the waveform model may include a second set of super-pulses characterized by a second Tc different than the first Tc. In example embodiments, the first and second component waveforms may be characterized by the super-pulses of the first and second respective waveforms having one or more of (i) differing numbers of pulses M, (ii) differing pulse cycle Tp (iii) differing high pulse frequencies Fh (iv) differing low pulse frequencies and/or (iii) differing inactive phases Ti. In general, the goal is to combine component waveforms having different ambiguity ranges, e.g., for velocity. In some embodiments, such a combination may be a sequential alternating between super-pulses of each component waveform. For example, a super-pulse of a first component waveform may be followed by a super-pulse of a second component waveform. In other embodiments, the component waveforms may be interleaved, e.g., where individual pulses of a super-pulse of a second component waveform are synched between individual pulses of a super-pulse of a second component waveform. Notably, the subject application is not limited to such embodiments, however, and other ways of combining component waveforms may also be utilized. For example, in some embodiments, component waveforms may be multiplexed in any way, e.g., via time-division multiplexing, frequency-division multiplexing, polarization-division multiplexing, code-division multiplexing, etc.

As described herein, the velocity ambiguity range may be provided by the following equation:

$$V_{amb} = \frac{C}{T_c * (F_H + F_L)}$$

Note that, as described above, Tc>Ta=M×Tp. Thus, based on the forgoing equation, any change to Tc, Ta, M, Tp, Fh, Fl, or Ti will result in a different Vamb (note that in some embodiments, Tc may be changed by changing either Ta or Ti and Ta may be changed by changing M or Tp). Thus, relying on the above principles, the composite waveform may include a sequence of sets of super-pulses wherein at least two different Vamb values are reflected in the different sets of super-pulses (e.g., in different composite waveforms which are based on the same waveform model described herein).

Also note that while, example embodiments described herein may be generally illustrated with respect to the use of two different sets of super-pulses, the present disclosure it not limited to such embodiments. Rather, as will be appreciated by a person of ordinary skill in the art, a composite waveform formed by alternating super-pulse sets from first and second composite waveforms may also alternate super-pulse sets from third, fourth fifth (etc.) component waveforms, each based on the waveform model described herein and each advantageously with a different ambiguity range for velocity.

Figure 5:
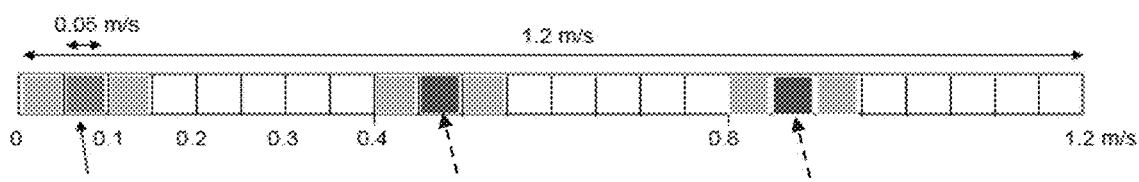
FIGS. 5 and 6 depict velocity ambiguity ranges for example component waveforms, according to the present disclosure.
Figure 6:
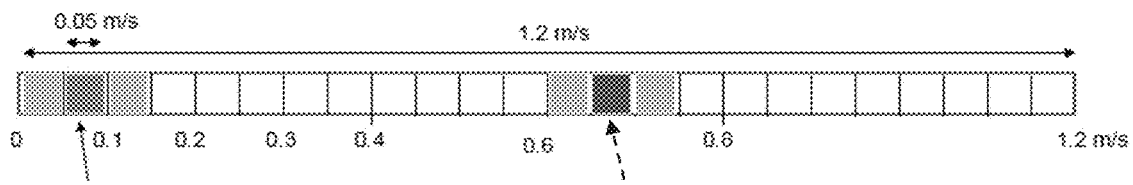

FIGS. 5 and 6 provide illustrate calculation of velocity ambiguity ranges for respective sets of super-pulses. In FIG. 5, the example component waveform is characterized by the following set of parameters (note that Tset represents the time cycle time for the entire super-pulse set):
Parameter Set 1 $T_{set}$=40.0 ms;
  $T_c$=4.9 ms;
  $T_p$=50.0 us;
  $F_L$ 76.0 GHz;
  $F_H$=77.0 GHz;
  M=16;
  N=8;

Using the above equations, the velocity ambiguity range (also known as the Doppler Nyquist) can be calculated as 0.4 m/s. This means that there is resulting ambiguity between Doppler bins that represent velocities 0.4 m/s apart. Thus, in FIG. 5 if the true target is the bins indicated by the solid arrow, the shaded bins to the right indicated by the dashed arrows represent Doppler bins that are difficult to distinguish in same cycle. Note that the fine Doppler bin in this example is 0.05 m/s (representing the smallest resolvable unit within the ambiguous range).

Similar to the waveform in FIG. 5, the example component waveform in FIG. 6 is characterized by the following parameters (note that they are slightly different than the parameters in FIG. 5 with Tc having been reduced):
Parameter Set 2 $T_{set}$=40.0 ms;
  $T_c$=3.268 ms;
  $T_p$=50.0 us;
  $F_L$=76.0 GHz;
  $F_H$=77.0 GHz;
  M=16;
  N=8;

Again, using the above equations, the velocity ambiguity range (also known as the Doppler Nyquist) can be calculated as 0.6 m/s. This means that there is resulting ambiguity between Doppler bins that represent velocities 0.6 m/s apart. Thus, in FIG. 6 if the true target is the bins indicated by the solid arrow, the shaded bins to the right indicated by the dashed arrow represent Doppler bins that are difficult to distinguish in the same cycle. Note that in the examples of FIG. 6, as in FIG. 5 the fine Doppler bin is 0.05 m/s (representing the smallest resolvable unit within the ambiguous range).

Figure 7:
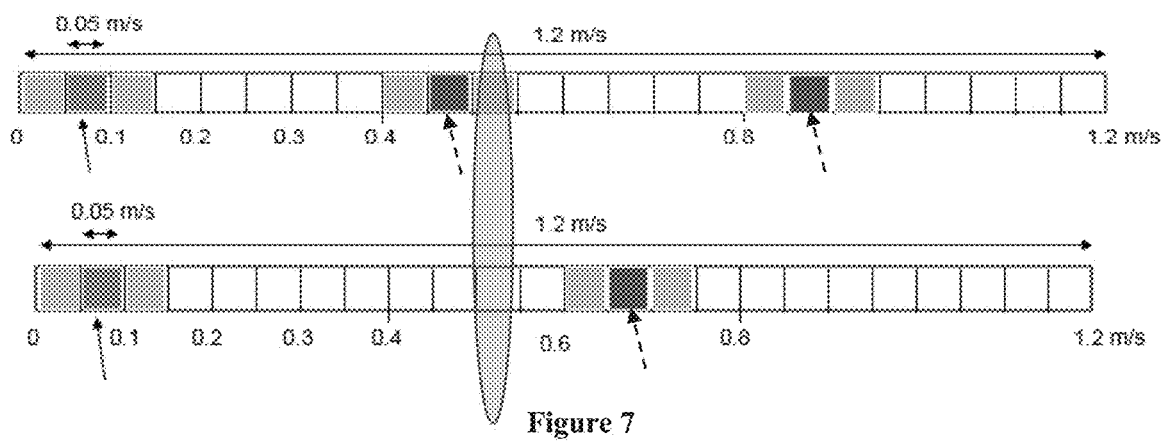
FIG. 7 depicts ambiguity resolution based on the example component waveforms of FIGS. 5 and 6, according to the present disclosure.

As illustrated in FIG. 7, if above two set parameters (from the example component waveforms of FIGS. 5 and 6) are alternatively applied via a composite waveform, the false targets represented by the shaded bins indicated by the dashed arrows can be distinguished from the true target represented by the shaded bins indicated by the solid arrow based on differing corresponding bins of the other component waveform. Thus, by combining data from corresponding bins for the first and second component waveforms, there is no non-distinguishable bin. This combination of data can be implemented in a number of ways. In example embodiments, sampling for the previous several sets of super-pulses can buffered with combined results generated for every observe cycle. Then the true velocity can be determined, e.g., based on the corresponding Doppler bins that correctly reflect the ambiguous velocity for both component waveforms (e.g., the target would be implicated by an ambiguity velocity of 0.15 (+some multiple of 0.4 m/s) for the first component waveform and an ambiguity velocity of 0.55 (+some multiple of 0.6 m/s) for the second component waveform. There is only one combination of corresponding bins that meets this requirement (thereby resolving the ambiguity).

Figure 8:
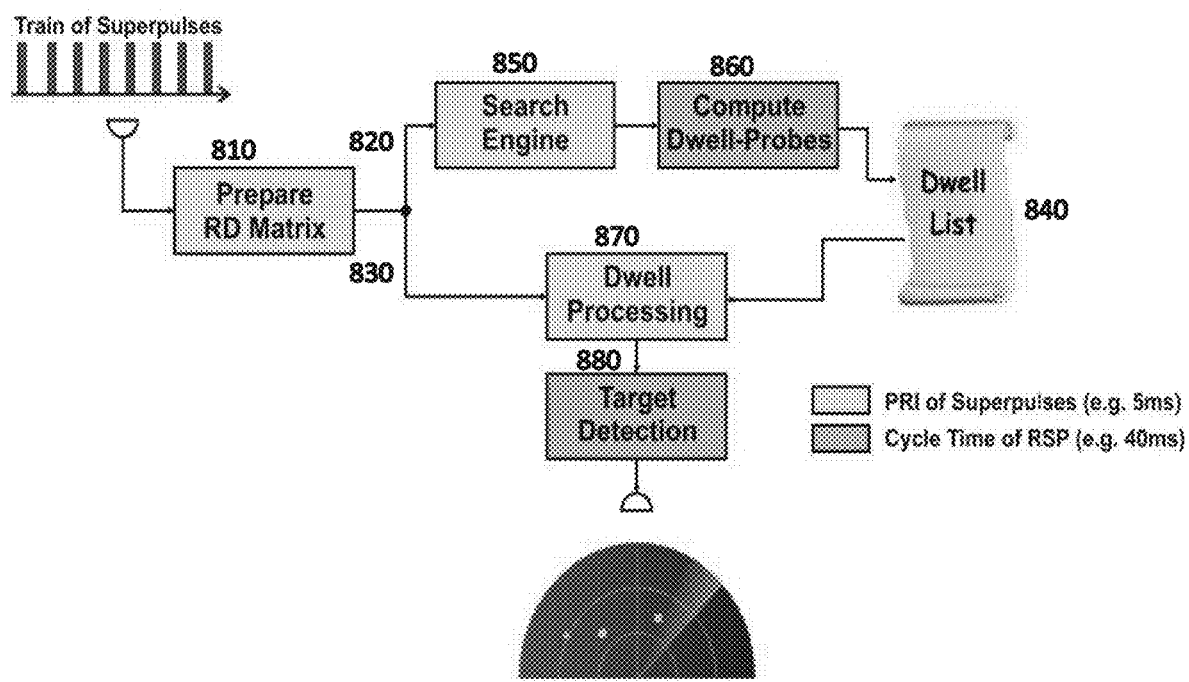
FIG. 8 depicts an example search and dwell processing algorithm which may be used to implement the ambiguity resolution techniques described herein, accordingly the present disclosure.

Turing to FIG. 8, it is noted that the ambiguity resolution systems and methods described herein may advantageously be applied in the context of (e.g., as a module of) a larger search and dwell processing (SAD) processing algorithm which may be configured to maximize the performance with limited demand on calculation and memory resources. SAD is the choice balanced for performance and resource demanded. Comparing with the ordinary block processing, SAD has much low demand on RAM memory, with minimized performance change.

The SAD algorithm is described in greater detail in PCT Publication No. WO2016188895 the contents of which are hereby incorporated herein. In the SAD algorithm IF signals are sampled at a certain predetermined sampling frequency fs and converted to digital signals. Notably, the sampling frequency fs may be provided by way of a sampling and timing signal produced by a sampling and timing arrangement and may be responsive to changing resolution requirements, e.g., depending on characteristics such as target size, target identification, target speed, target position, target range, host vehicle speed, environment (such as highway vs city vs parking lot), etc. A transceiver arrangement including a DSP may then be adapted for radar signal processing by means of a first FFT (Fast Fourier Transform) to convert the digital signals to a range domain, and a second FFT to combine the results from successive pulses into the Doppler domain thereby producing a two-dimensional spectrum of a Range-Doppler matrix 810. In general, the SAD algorithm involves, processing the Range-Doppler matrix via two parallel processing paths 820 and 830. The first processing path 820 is arranged to produce a periodically updated dwell list 840, and the second processing path 830 is arranged to collect and process data from the Range-Doppler matrix 810 in dependence of the present dwell list 840. By means of the dwell list 840, it is possible for the second processing path 830 to focus the processing efforts for true target detection where there is an increased possibility for presence of objects. The dwell list 840 comprises information where the probability of presence of objects exceeds a certain threshold. The SAD algorithm is described in greater detail in the sections which follow.

At an initial step 810, Range-Doppler (RD) matrixes are prepared. As noted above, this function block basically contains the implementation of a two-dimensional Fourier transform of the input time domain matrix, where the produced matrix has a range dimension as well as a Doppler dimension. Notably, there is one RD matrix for each Tx-Rx combination of every super-pulse. For example, assuming 2 Tx channels an 4 Rx channels, this results in 8 Tx-Rx combinations and therefore 8 RD matrices. The range resolution for the RD matrix is based on:

$$R_{RES} = \frac{N_S - 1}{N_S} \cdot \frac{C_0}{2 \cdot BW}$$

Wherein the bandwidth BW equals the frequency high (FH) minus the frequency low (FL) and where NS is the number of samples per Tx ramp. Velocity resolution, as noted above, is based on:

$$V_{RES} = \frac{C}{T_c * (F_H + F_L)}$$

The first processing path 820 begins with search processing 850 where the primary task of the search engine is to identify those Range-Doppler (RD) cells which most likely contain energy of radar targets. For this purpose, the consistency of the magnitudes of the transformed RD-matrices is evaluated one at a time. Since the individual pulses cannot be saved, it is necessary to sequentially work through the process and get the most important information in compressed form. In example embodiments, the sequential probability ratio test (SPRT) provides the framework for search processing. As described in WO2016188895 search processing may include sub-steps of noise estimation, log-likelihood function (LLF) matrix alignment, probability ratio computation and updating the LLF matrix.

In particular, the noise floor for all ranges is estimated in the Doppler dimension within the RD magnitude matrix. The median function is able to provide a relatively robust estimation. It is the nature of the Range-Doppler matrix that frequencies in the range dimension are changing as a function of time. The range-rate of the energy within a certain RD-cell can be derived from the cell index in the Doppler dimension. In order to keep track of the received energy the LLF matrix is altered with respect to this relation. As noted above, the search module is arranged to find Range-Doppler (RD) matrix elements which most likely contain energy of radar targets. For this purpose, the consistency of the magnitudes of the Range-Doppler matrix is evaluated one at a time. Since the individual pulses are not saved, it is necessary to sequentially work through the process and get the most important information in compressed form. This may for example be accomplished by combining the pulse blocks of one or more processing cycles with the aim to restore both the detection probability and the resolution using the SPRT algorithm. The ideal implementation of a sequential detection algorithm requires a decision to be made after every pulse block, where three decision outcomes are possible: No Target, Target Present, and No Decision. If the latter decision is made, then another pulse block is evaluated. The probability ratio computation step is arranged to perform sequential detection using the SPRT algorithm. In order to adapt this algorithm to radar sensors, a calculated signal magnitude, m, is assumed as based on the on-going collection of noisy radar signal observations, so far comprising N such observations. The function fo (m) is a probability density function for the calculated signal magnitude m, when an object is actually present at some specified magnitude, and the function fl (m) is the probability density function for the calculated signal magnitude m, when no such object is actually present. According to SPRT theory, the ratio, r, provides a measure of the relative probability of the object being present or not where:

$$r = \frac{f_0(m)}{f_1(m)}$$

In updating the LLF matrix, a target signal detection decision is made. For example, where r>A it may be decided that a target is present, while were r<B it may be decided that a target is not present. Otherwise additional observation may be required.

At the end of every radar signal processing cycle dwell-probe positioning is calculated (step 860). This includes identifying the loaded bins in the RD matrix (e.g., where r>A) and calculating dwell positions. In order to lose as little energy as possible during the dwelling process, it is necessary to put the measuring point to the optimum position. The calculation is basically the prediction of the target position using the current position, dwell duration, and the target speed represented by the Doppler index.

The second processing path 830 involves applying dwelling processing 870 and results in target detection 880. In dwelling processing 870, complex data is collected from the transformed superpulse matrix. Notably, the values which are copied from the data matrix are reflected in the dwell list 840. In target detection, dwell data is transformed via a proper window function for each dwell signal. All dwell signals are also converted into the frequency domain. A peak detection subroutine may then be applied based on a magnitude signal created from the complex FFT output. In particular, a detection threshold may be applied taking into account a noise floor for each signal. Radar parameter estimation is then applied where parameters such as range, Doppler and bearing are calculated for each target. For this purpose, it is necessary to consider the orthogonal neighboring cells in the three-dimensional signal space of every target peak. Notably, with the magnitudes of the neighbors one can apply 3-point interpolation.

The SAD algorithm can use improvement with respect to resolving speed ambiguity. For example, under one set of designed parameters, there is a speed ambiguity of 0.4 m/s. Which leads to an issue of distinguishing the 0.4 mps target from stationary target when these two targets being at same range (distance) and azimuth (velocity) bin. Thus the systems and methods described herein are intend to improve SAD speed measurement ambiguity performance.

One function of the SAD algorithm stems from specific implementation with respect to automotive radar systems. In particular, in the context of automotive radar systems, low host (the vehicle with the detector) speed (for example speed of less than 15 m/s) reduces the range (distance) of interest. Indeed, at lower speeds there is no need to detect far away target objects (e.g., as far away as 150 meter). As a general rule a collision safety range can be applied which accounts for a time to impact. Thus, for example, a safety range of 3-5 seconds (e.g., 4 seconds) can be applied. At 20 m/s a safety range of 4 seconds means that the necessary distance/range for resolving is only 80 m. Thus, in general, detection range may be reduced based on the host speed. In the context of a high speed environment (such as a highway environment) block processing may be avoided to save resources. Thus, the SAD algorithms may be employed to reduce memory demands. In contrast, for a low speed environment, fewer range bins are required to be resolved. Thus, block processing may be implemented to utilize the full potential of the calculation power and memory resource. For example, if the host speed is greater than 15 m/s the SAD algorithm may be used to allow for the longer detection distance. If the speed is lower than 10 m/s, then the block processing algorithm is used to cover only the 50 m detection range. Thus, in some embodiments, the SAD algorithm may be configured to selectively apply ambiguity resolution only where the host vehicle is in a predetermined range a predetermined velocity. In such embodiments, a lower velocity host vehicle may have a shorter required distance range for detection which may facilitate ambiguity resolution. Alternatively, ambiguity resolution may only be required where a target is within a predetermined range of the host vehicle. Again the predetermined range may be a dynamic range based on the velocity of the host vehicle.

In example embodiments, range resolution has an important role in the SAD approach. The higher the range resolution the better the performance of the search algorithm checking the consistency of Doppler vs. range rate. Therefore, the strategy of the waveform design is different than for the conventional processing. Here we start with the maximum allowed transmit bandwidth and adjust the rest of radar parameter. In some embodiments, different resolution requirements may be achieved via different component waveforms (e.g., accounting for different transmit channels). It should also be noted that there are two ways to include a second transmit channel into the SAD algorithm. Firstly, one can interleave transmit channels (interleave pulses). Secondly, one can alternate channels (alternate super-pulses). The main advantage of the second approach over the first approach is that it requires only half of memory to store the entrance RD matrix. The biggest disadvantage is that the pulse range interval (PRI) of the super-pulses would double as fast as with the first approach.

Figure 1:
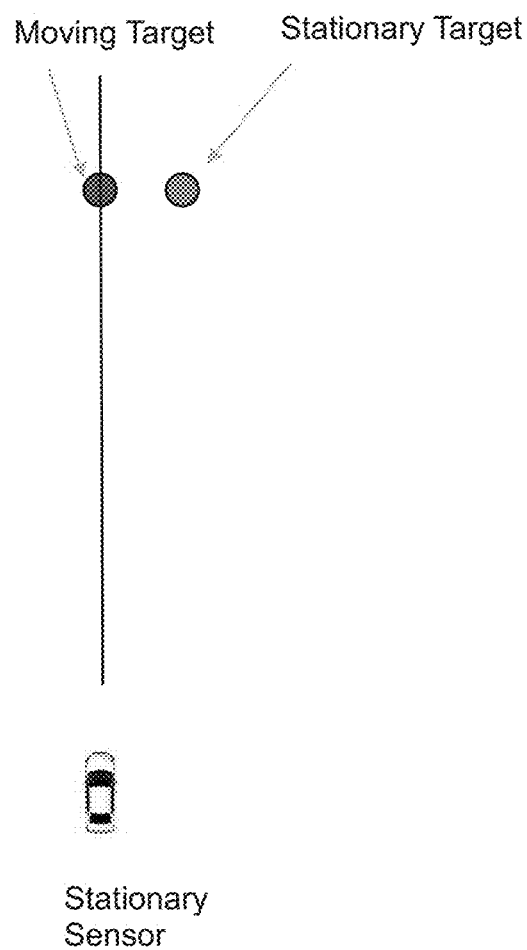
FIG. 1 depicts an investigative setup for demonstrating the impact of velocity ambiguity in the context of multiple target vehicles, according to the present disclosure.
Figure 2:
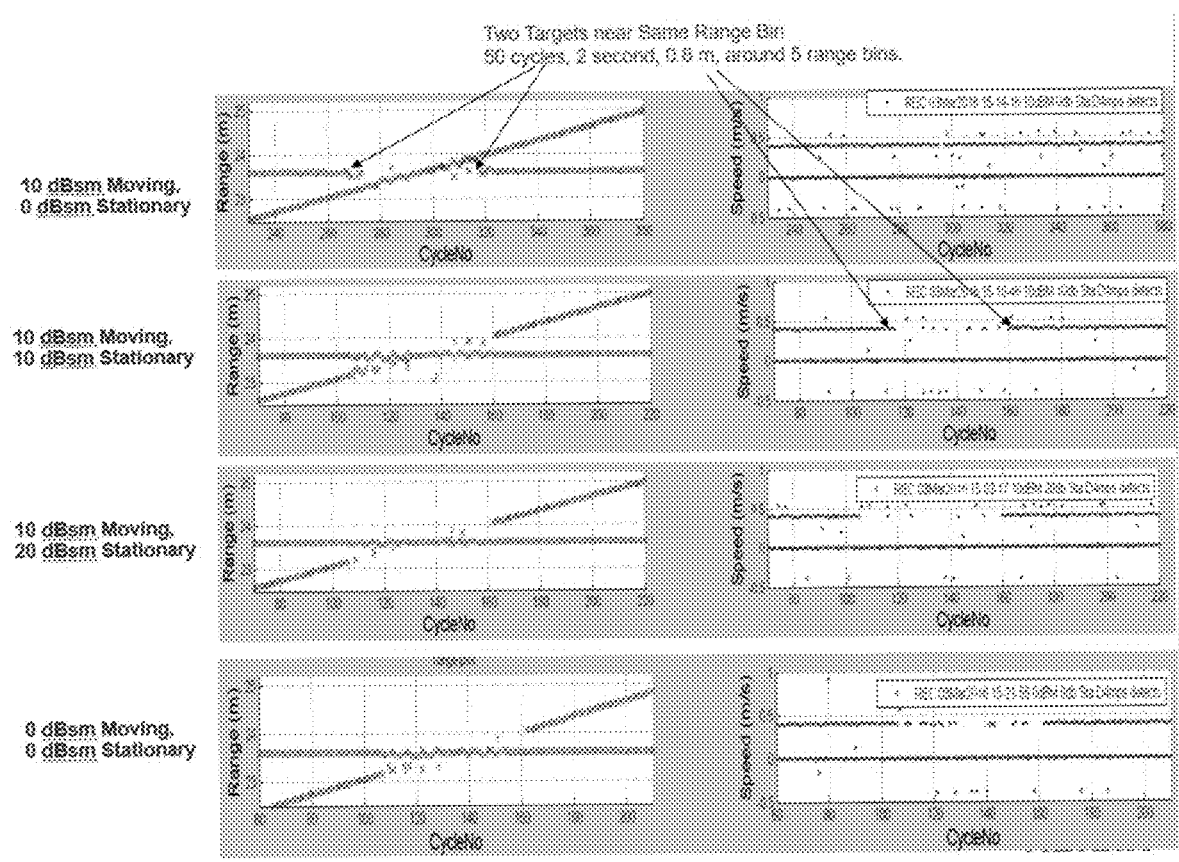
FIG. 2 depicts results from the investigative setup of FIG. 1, according to the present disclosure.

As noted herein, one advantage of the SAD algorithm is the ability to use target tracking between pulses to facilitate Doppler estimation. In particular, as a target's position changes velocity for a target can be estimated based on such a change in position between successive blocks (e.g., assuming a constant velocity). This velocity estimate can be utilized as a coarse prediction to help resolve the finer Doppler estimation with its limited Nyquist range. Notably, however, the SAD algorithm is somewhat reliant on being able to track individual targets. Thus, where multiple targets overlap (as shown in FIG. 2) it may be difficult to track target position and resolve Doppler measurements in that way. Thus, in some embodiments, ambiguity resolution processing, such as described herein may be applied to supplement the tracking approach of the SAD algorithm. For example, in some embodiments, ambiguity resolution may be applied to facilitate resolving Doppler measurements specifically in the case of overlapping targets. Otherwise processing power may be conserved.

Another advantage of the SAD algorithm discussed herein is the ability to apply to utilize component waveforms and windowing/sampling processes which are advantageously designed to meet different resolution specifications. For example, in some embodiments, different resolution specifications may be required based on characteristics such as target size, target identification, target speed, target position, target range, host vehicle speed, environment (such as highway vs city vs parking lot), etc. Thus, it may be advantages to utilize different component waveforms which, when combined, are able to meet the resolution specifications for each active scenario. For example, in some embodiments, a composite waveform may include a first component waveform that is able to resolve out to a greater range but with a lower velocity resolution and a second waveform component which is able to resolve out to a shorter range but with greater velocity resolution. Notably, these two composite waveforms may also simultaneously be applied to helping facilitate ambiguity resolution. In some embodiments, windowing/sampling may be applied to control the number of resolvable bins based on active scenarios. Thus, for example, memory load may be reduced when coarser range resolution is ok (such as at high velocities). The waveform variation examples described below further illustrate these concepts. For example, in some embodiments, fewer range bins may be processed, e.g., for certain component waveforms and/or scenarios, thereby reducing processor and memory load. In other embodiments, the same ADC sampling rate may be used regardless. In further embodiments, there may be a reduced sampling number for each ramp. The range processing bin/cell number for example can be reduced by half, so the total sampling point for each ramp or FFT points will be reduced by half, and the ramp time will be reduced by half, again reducing processor and memory load. The forgoing examples are to illustrating of a general concept of waveform and/or sampling/windowing parameters taking into consideration balanced demands for different scenarios while allowing for efficient use of resources.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A radar system for a host vehicle comprising:
one or more signal generators configured for generating a composite linear frequency modulated continuous waveform formed by combining different component waveforms; and
a detector for detecting reflected signals from the composite waveform and determining velocity and distance measurements of a target relative to the host vehicle;
wherein the first and second component waveforms are selected such that the composite waveform is able to simultaneously meet two different sets of resolution requirements with respect to at least one of: (i) the velocity measurement of the target vehicle relative to the host vehicle and (ii) the distance measurement of the target vehicle relative to the host vehicle; and
wherein each of the different sets of resolution requirements is pre-selected for a different detection scenario.

2. The radar system of claim 1, wherein the first and second component waveforms each include a series of pulses.

3. The radar system of claim 2, wherein the first component waveform has a different pulse repetition pattern than the second pulse repetition frequency, wherein a first pulse repetition pattern of the first component waveform is selected to meet a first predetermined set of resolution requirements applicable for a first detection scenario and a second pulse repetition pattern of the second component waveform is selected to meet a second predetermined set of resolution requirements applicable for a second detection scenario.

4. The radar system of claim 3, wherein the first pulse repetition pattern is characterized by a different pulse repetition frequency than the second pulse repetition pattern.

5. The radar system of claim 2, wherein each component waveform includes a repeated super-pulse sequence (of a plurality N of super-pulses) with a pre-determined cycle time (Tc), each super-pulse cycle including an active phase with a time $Ta<Tc$ and an inactive phase with a time $Ti<Tc$, wherein $Ta+Ti=Tc$, the active phase characterized by a sequence of a plurality of pulses (M pulses) each with a pulse duration Td.

6. The radar system of claim 5, wherein each component waveform is characterized by a different cycle time Tc for its repeated super-pulse sequence.

7. The radar system of claim 6, wherein the different cycle time Tc is characterized by a different active phase Ta as characterized by one or more of: (i) a different number of pulses per super-pulse or (ii) a different pulse duration Td.

8. The radar system of claim 6, wherein the different cycle time Tc is characterized by a different inactive phase Ti.

9. The radar system of claim 6, wherein each component waveform is characterized by one or more of: (i) a different low pulse frequencies Fl or (ii) a different high pulse frequency Fh.

10. The radar system of claim 5, wherein each pulse is further characterized by a change in frequency between low and high pulse frequencies (Fl and Fh).

11. The radar system of claim 2, wherein the pulses are coherent.

12. The radar system of claim 11, wherein the first and second component waveforms are each frequency modulated waveforms.

13. The radar system of claim 1, wherein the first and second component waveforms are each repetitive oscillation waveforms.

14. The radar system of claim 13, wherein oscillations in each of the first and component waveforms vary between low and high pulse frequencies (Fl and Fh).

15. The radar system of claim 14, wherein each component waveform is characterized by one or more of: (i) a different low pulse frequencies Fl or (ii) a different high pulse frequency Fh.

16. The radar system of claim 13, wherein the first and second component waveforms are each continuous waveforms.

17. The radar system of claim 1, wherein the first and second component waveforms are interleaved to form the composite waveform.

18. The radar system of claim 1, wherein the first and second component waveforms are alternated to form the composite waveform.

19. The radar system of claim 1, wherein a sampling of the composite waveform is constant.

20. The radar system of claim 1, wherein sampling of the composite waveform is variable for each of the component waveforms.

21. The radar system of claim 1, wherein the different sets of resolution requirements includes a first set of resolution requirements for a first scenario involving increased maximum distance resolution requirements and reduced velocity and range accuracy requirements and a second set of resolution requirements for a second scenario involving decreased maximum range requirements and increased velocity and range accuracy requirements.

22. The radar system of claim 21, wherein each of the different sets of resolution requirements is for a different scenario as characterized by target size, target identification, target speed, target position, target range, host vehicle speed and/or environment.

23. The system of claim 1, wherein the each set of resolution requirements includes different accuracy requirements for at least one of: (i) the velocity measurement of the target vehicle relative to the host vehicle and (ii) the distance measurement of the target vehicle relative to the host vehicle.

24. The system of claim 1, wherein the each set of resolution requirements includes different maximum, minimum or resolvable range requirements for at least one of: (i) the velocity measurement of the target vehicle relative to the host vehicle and (ii) the distance measurement of the target vehicle relative to the host vehicle.

25. The radar system of claim 1, further comprising a processor for ambiguity resolution, the processor configured to determine a true velocity for a target based determining corresponding Doppler bins that correctly reflect ambiguous velocity calculations for both component waveforms.

* * * * *